ELECTRICAL APPARATUS

Filed Jan. 18, 1967 8 Sheets-Sheet 1

INVENTOR.
IVARS P. BREIKSS
BY
J. Donald Weber Jr.
ATTORNEY.

INVENTOR.
IVARS P. BREIKSS
BY G. Donald Weber, Jr.
ATTORNEY.

March 10, 1970 I. P. BREIKSS 3,500,331
ELECTRICAL APPARATUS
Filed Jan. 18, 1967 8 Sheets-Sheet 3

INVENTOR.
IVARS P. BREIKSS
BY [signature]
ATTORNEY.

INVENTOR.
IVARS P. BREIKSS
BY
J. Donald Weber, Jr.
ATTORNEY.

INVENTOR.
IVARS P. BREIKSS
BY
J. Donald Weber Jr.
ATTORNEY.

INVENTOR.
IVARS P. BREIKSS
BY J. Donald Weber, Jr.
ATTORNEY.

ELECTRICAL APPARATUS

Filed Jan. 18, 1967 8 Sheets-Sheet 7

INVENTOR.
IVARS P. BREIKSS

BY

[signature]

ATTORNEY.

INVENTOR.
IVARS P. BREIKSS
BY G. Donald Weber Jr.
ATTORNEY.

United States Patent Office 3,500,331
Patented Mar. 10, 1970

3,500,331
ELECTRICAL APPARATUS
Ivars P. Breikss, Littleton, Colo., assignor to Honeywell, Inc., Minneapolis, Minn., a corporation of Delaware
Filed Jan. 18, 1967, Ser. No. 610,185
Int. Cl. G11b *13/00;* G06f *1/00;* G08b *23/00*
U.S. Cl. 340—172.5 5 Claims

ABSTRACT OF THE DISCLOSURE

A circuit is utilized to operate on coded signals, for example binary coded decimal signals, to generate other signals which are decimal coded signals. A control circuit selectively supplied the various coded signal, at a predetermined time, to an output device which causes the printing of a selected character.

CROSS REFERENCES

The subject matter of this application is related to several copending applications. One copending application is Ser. No. 478,115, entitled Alphanumeric Printer, by Norman L. Stauffer which was filed on Aug. 9, 1969 and is now abandoned. In addition, a continuation-in-part application of the aforesaid application of Norman L. Stauffer entitled Alphanumeric Galvanometer Recorder, Ser. No. 596,288, was filed on Nov. 22, 1966, (per B) and is now U.S. Patent 3,422,444. These applications relate to mechanical and optical aspects of a printing device which utilizes or is controlled by circuitry such as described herein.

BACKGROUND

This invention relates to electrical circuitry which is utilized to control a printer such as a galvanometer printer. More particularly, the circuit operates on coded input electrical signals and converts these signals to the specific function signals which are applied to a printing mechanism, for example the aforementioned galvanometer printer. There are several printers commercially available which utilize galvanometers to direct a light beam to a light sensitive recording medium. These commercially available devices generally require two galvanometers per character to be recorded. The subject printer utilizes a single galvanometer per character. Consequently, new and improved circuitry and control techniques are required to operate the single galvanometer.

Furthermore, this invention permits a first method of printing wherein a plurality of characters are recorded on the recording medium in a horizontal arrangement. A second method of printing is available wherein a plurality of characters may be recorded vertically, for example, in a single column. Each of these methods of printing is desirable in different applications of the printer.

Thus, one object of this invention is to provide circuitry for controlling a printing device.

Another object of this invention is to provide circuitry which selectively controls different methods of printing by the printing device.

Another object of this invention is to provide a relatively simple circuit wherein coding and/or decoding of electrical signals is achieved.

Another object of this invention is to utilize coded signals to provide control signals to a printing mechanism whereby characters are recorded on a recording medium.

These and other objects and advantages of this invention will become more readily apparent when the following description is read in conjunction with the attached drawings in which.

DESCRIPTION OF PREFERRED EMBODIMENTS

Figure 1:
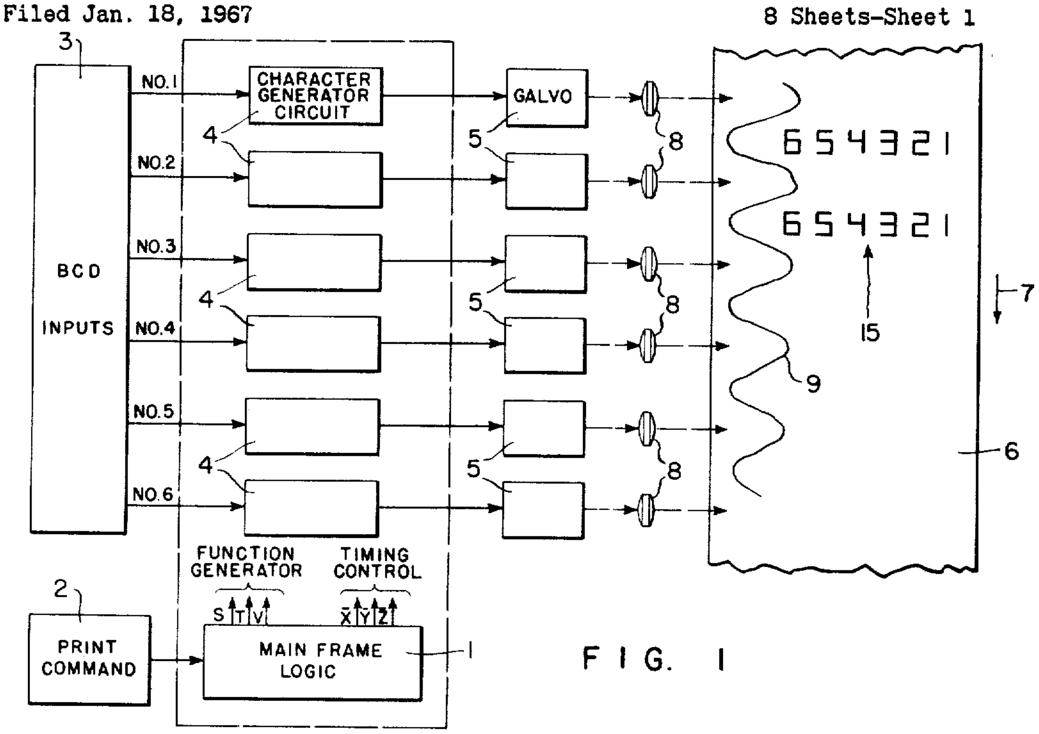
FIGURE 1 is a block diagram of one embodiment of the system utilized in one method of printing.

Referring now to FIGURE 1, a block diagram of the system used to control the horizontal method of printing is disclosed. A main frame or control logic circuit 1 provides the basic control functions. The main frame logic circuit 1 is described in greater detail hereinafter. A print command signal is supplied by a print command control element 2. The print command signal generated by element 2 is indicative of the start of the operation of main frame logic circuit 1. Control element 2 may be initiated by any outside agency such as a push button, additional circuitry or the like.

Binary coded decimal (BCD) inputs are supplied by a source 3. Source 3 may be any typical source which is to be monitored. In the embodiment shown, source 3 provides six BCD signals or digits. Each of the BCD signals or digits may include, for example, four individual signals or bits which are representative of the BCD version of an input signal. Each of the BCD digit signals are supplied to a separate character generating network 4.

The outputs from character generating circuit 4 are supplied to individual galvanometers 5. Again, in the embodiment shown there are six galvanometers; one connected to each of the several character generating circuits 4. A recording medium 6, which moves in the direction represented by arrow 7, is disposed adjacent the galvanometers 5. Through means of a suitable optical system, represented by lenses 8, light beams generated by galvanometers 5 impinge upon the surface of recording medium 6. The impingment of a light beam on the recording medium 6 (which may be a light sensitive medium) causes the printing of characters 15. Additional galvanometers (not shown) may be utilized to provide traces similar to trace 9. It is to be understood, that each of the galvanometers 5 produces one of the characters shown on the medium 6. That is, the six galvanometers shown produce parallel-type output signals which are substantially simultaneously applied to the recording medium 6 wherein a horizontal row of characters is printed.

Logic circuit 1 produces function generator signals S, T and V. Additionally, logic circuit 1 produces the timing control signals $\overline{X}$, $\overline{Y}$ and $\overline{Z}$. These signals, i.e. function generator signals and timing control signals, are applied to each and every character generating circuit. As will appear in detail hereinafter, function generator signals S, T and V provide signals which provide certain traces of the characters on the recording medium. For example, the S signal may produce the spike output, while the T and V signals may produce the left and right-hand "wiggle" signals.

The timing control signals $\overline{X}$, $\overline{Y}$, $\overline{Z}$ permit function generator signals to be applied to the recording medium during certain time zones or time periods. Through the proper combination of function generating signals, timing control signals and coded signals from BCD input 3, various traces relating to any character and produced at the proper time and position.

In the embodiment suggested in FIGURE 1, there are shown six BCD inputs, character generator circuits, galvanometers, optical systems and printed characters. Each path comprising this combination of elements and components may be termed a channel. Thus, there are six channels shown in FIGURE 1. However, more or fewer channels may be incorporated in accordance with the desired or required number of characters to be printed.

Figure 2:
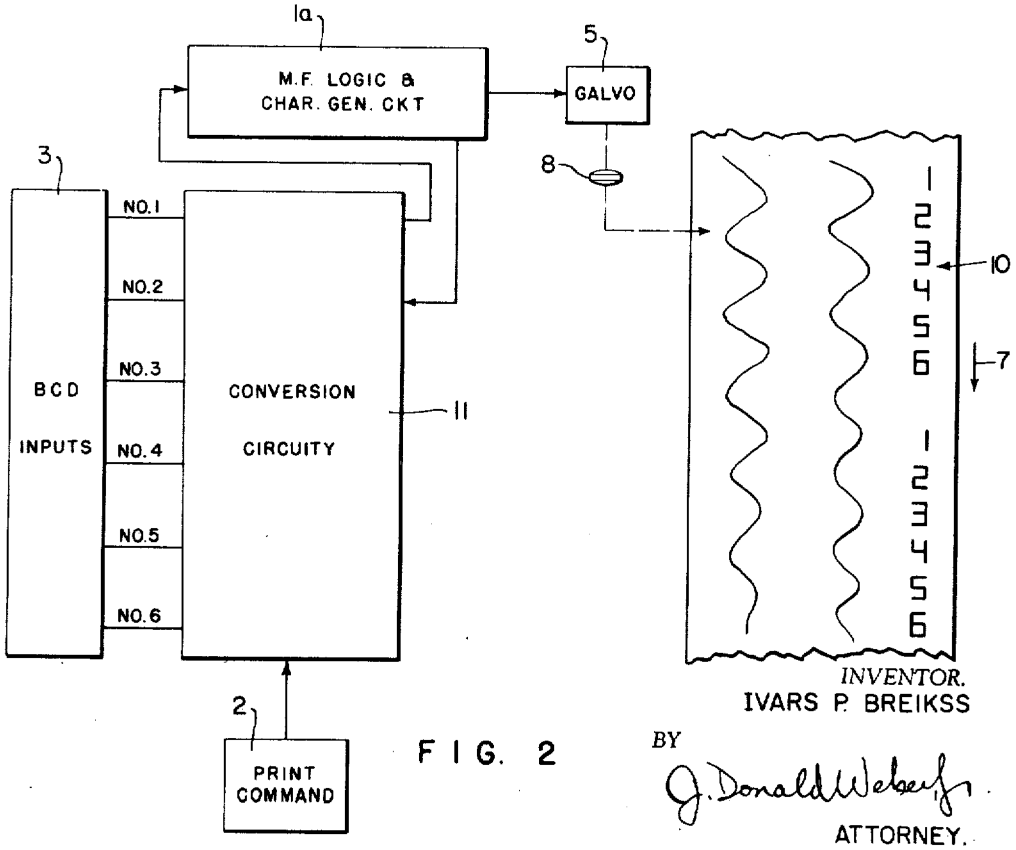
FIGURE 2 is a block diagram of a further embodiment of the invention wherein a second method of printing is achieved.

Referring now to FIGURE 2, there is shown a flow diagram for a second embodiment of the instant invention. In FIGURE 2, components which are similar to those shown in FIGURE 1 bear similar reference numerals. Thus, a print command control element 2 supplies a signal to conversion circuitry 11. BCD input device 3 supplies six coded digit signals to conversion circuitry 11. Again, each of the six digit signals may include four bit signals which provide the coded representation of a character. Conversion circuitry 11 supplies an output signal to the main frame logic and character generator circuit element 1*a*. For the sake of simplicity, element 1*a* may comprise the main frame logic circuit 1, as well as, at least one character generator circuit 4, as shown in FIGURE 1. One output of the control circuitry 1*a* is returned to conversion circuitry 11 to supply an input signal thereto. Another output of control circuitry 1*a* is supplied to a single galvanometer 5 to control the operation thereof. A light beam signal controlled by galvanometer 5 is passed through a suitable optical system 8 to impinge upon recording medium 6 which moves in the direction of arrow 7. As noted supra, a separate galvanometer apparatus may be utilized to provide traces 9 on the recording medium. In the instant embodiment, the characters 10 are shown recorded in a vertical alignment.

Basically, the operation of this embodiment is similar to the operation of the embodiment shown in FIGURE 1 with the exception that conversion circuitry 11 operates upon the six BCD digit inputs to store and, thus, convert same from parallel or simultaneously supplied inputs to serial or sequential outputs. Thus, six BCD inputs are substantially simultaneously supplied to conversion circuitry 11. These input signals are stored therein and, in accordance with control circuitry therein, these six inputs are sequentially applied to control element 1*a* to effect the necessary and desirable control over galvanometer 5 and, thus, the printing. Since a single galvanometer 5 is utilized, only one of the BCD inputs may be operated upon at any given time. Consequently, conversion circuit 11 includes sequencing means such that the six inputs stored therein are read out one at a time and applied to the galvanometer.

In this embodiment, a single character channel is sufficient. That is, through the operation of the conversion circuitry 11, a plurality of parallel inputs are converted to serial outputs which pass through a single channel, sequentially, rather than through a plurality of channels simultaneously. The details of conversion circuit 11 are described hereinafter.

Figure 3:
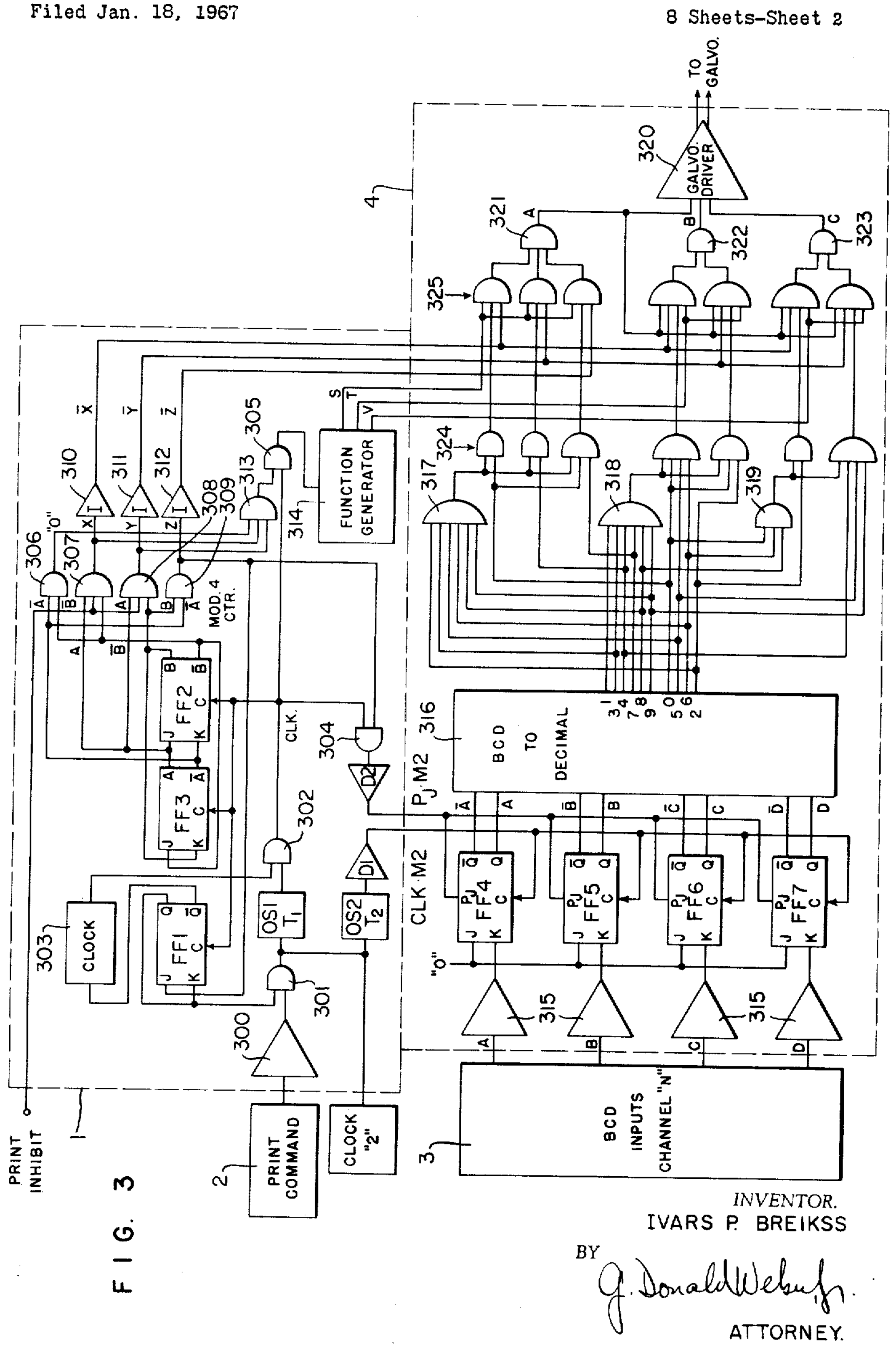
FIGURE 3 is a logical flow diagram of the system embodiment shown in FIGURE 1.

Referring now to FIGURE 3, there is shown a logical flow diagram of the electronic portion of the embodiment shown in FIGURE 1. In FIGURE 3, the blocks shown in FIGURE 1 are indicated in solid or dashed line.

Print command input 2 is coupled to input buffer or amplifier 300. The coupling may be by means of a diode (not shown) in order to provide circuit isolation. Input buffer 300 is connected to one input of AND gate 301. Another input of AND gate 301 is supplied by the Q output of flip-flop FF1. The output of gate 301 is connected to inputs of the one shot circuits OS1 and OS2. The one shot circuits have different time periods designated as T1 and T2 wherein T2 is greater than T1. The output of one shot OS2 is supplied via driver D1 to character generator circuit 4 as will appear hereinafter.

The output of one shot OS1 is connected as one input of OR gate 302. Another input of OR gate 302 is supplied by clock generator 303. The output of OR gate 302 is connected to the C (i.e. clock or toggle) input of flip-flops FF1, FF2, and FF3. The output of OR gate 302 is further connected as one input of AND gate 304. Another input of gate 304 is supplied by the Mod 4 counter. The output of AND gate 304 is connected by driver D2 to character generator circuit 4 as will appear hereinafter. The output of OR gate 302 is also connected as one input of AND gate 305.

Flip flop FF1, as noted supra, has the toggle input thereof connected to OR gate 302 and the Q output connected to an input of AND gate 301. The Q output is further connected to the K input of flip-flop FF1. The J input of JK flip-flop FF1 is connected to an output of the Mod 4 counter hereinafter described. The $\overline{Q}$ output of flip-flop FF1 is connected to clock generator 303 to selectively control the operation thereof.

Consequently, a print command signal (PC) is supplied as one input to AND gate 301. Flip-flop FF1 is initially set to the condition wherein the Q output is supplied. Consequently, AND gate 301 provides the $PC \cdot Q$ output signal to each of the one shots OS1 and OS2. Both one shots trigger on the leading edge of the pulse produced by AND gate 301 and provide output signals in accordance with the time period thereof. A signal produced by one shot OS1 is supplied to OR gate 302 whereby a toggle signal is supplied to flip-flop FF1. The toggle signal switches FF1 whereby the $\overline{Q}$ output signal is produced which enables the operation of clock generator 303 such that clock pulses are produced thereby.

Flip-flops FF2 and FF3 form a counter. The A and $\overline{A}$ signals of flip-flop FF3 are connected, respectively, to the J and K inputs of FF2. The B and $\overline{B}$ outputs of FF2 are supplied to the K and J inputs of FF3, respectively. The toggle inputs are connected to the output of OR gate 302. Each of the NOR gates 306, 307, 308 and 309 are connected with flip-flops FF2 and FF3 and form a Mod 4 counter. Thus, the A output of FF3 is connected as an input to each of NOR gates 307 and 308. The $\overline{A}$ output of FF3 is connected as an input to NOR gates 306 and 309. The B output of flip-flop FF2 is connected to an input of NOR gates 308 and 309. The $\overline{B}$ output of flip-flop FF2 is connected as an input to NOR gates 306 and 307. In addition, an external signal which is supplied by the circuitry represented by the second embodiment of this invention is supplied as an input to NOR gates 307 and 308. If the circuitry shown in the second embodiment of this invention is not utilized, this external signal is not provided.

The outputs of NOR gates 307, 308 and 309 are, respectively, applied to inverter gates 310, 311 and 312. The output signals from inverter gates 310, 311 and 312 are the timing signals $\overline{X}$, $\overline{Y}$ and $\overline{Z}$ which control the printing zone on the recording medium as suggested supra. The outputs of NOR gates 307, 308 and 309 are all connected as inputs to OR gate 313. The output of NOR gate 313 is connected as another input of gate 305 along with the input from OR gate 302. The output of gate 305 is connected to function generator 314 which produces output signals S, T and V. As noted supra, the S signal is a spike signal while the T and V signals represent the left and right-hand wiggle signals, as will be described hereinafter. The output signal from NOR gate 309 is supplied as another input to gate 304 along with the output of OR gate 302.

Flip-flops FF2 and FF3 are initially set in the condition whereby the $\overline{A}$ and $\overline{B}$ signals are zero or low level signals, and the A and B signals are ones or high level signals. Thus, NOR gate 306 operates with two zero inputs thereby producing a high level signal on the "0"

output signal. This signal is applied to AND gate 305 via OR gate 313. The application of the clock signal (CLK) via gate 302 enables AND gate 305 thereby providing a signal to function generator 314 whereby a spike signal S may be produced. Similarly, the CLK signal is applied to the C or toggle input of flip-flops FF1 and FF2. Since output A of flip-flop FF3 is initially set at a high level, the J input of FF2 is a high level whereby the toggle will not disturb the B and $\overline{B}$ signals thereof. However, the J input of flip-flop FF3 was initially a zero or low signal whereby the toggle signal will switch the states of the A and $\overline{A}$ signals of flip-flop FF3. Thus, a first clock signal produces zero signals on the $\overline{B}$ and A output signals. These signals are supplied as inputs to NOR gate 307 along with the external signal. In the absence of the modifications suggested in the second embodiment, this input signal is also a low level signal. Consequently, with the application in the first clock signal via OR gate 302, NOR gate 307 generates an output signal X which is supplied, by invertor 310, to the character generator and supplies a timing zone control signal.

Likewise, the next clock signal causes flip-flops FF2 and FF3 to supply input signals to NOR gate 308 which produce a signal therefrom. The signal produced by gate 308 provides via invertor 311, a timing zone control signal $\overline{Y}$.

Further clock signals will trigger flip-flops FF2 and FF3 such that NOR gate 309 produces an output signal Z. This signal is inverted by inverter 312 and provides the timing zone control signal $\overline{Z}$. In addition, the Z output signal is applied to AND gate 304 whereby, in conjunction with the clock signal, driver D2 is activated to supply the $P_J$M2 signal to the character generating circuit.

Additionally, the Z output signal is supplied to the J input of flip-flop FF1. The next clock signal after the Z signal is supplied triggers flip-flop FF1 to its initial condition whereby the Q output signal is a high level signal and the $\overline{Q}$ signal is a low level signal. The low level $\overline{Q}$ signal is supplied to clock generator 303 thereby inhibiting operation thereof. The Q output signal of flip-flop FF1 is supplied to AND gate 301 thereby enabling this gate in preparation for the next command signal. Thus, it is seen that control circuit 1 operates in response to a print command signal to trigger a clock generator which supplies clock signals to a counting network. The counting network supplies signals to the function generator whereby alternating signals or "wiggles," as well as a spiked signal, are generated. Moreover, the counter provides timing control signals at predefined times so that the character generating circuit can produce one or more of the signal functions during a timing zone whereby a character may be printed on a recording medium. These signals, and the character printing, are controlled by the character generator circuit 4.

Character generator circuit 4 receives BCD inputs from a suitable driving device. In the defined embodiment, the BCD inputs include four signals per input. These inputs are supplied by BCD input 3. The signals are supplied to input amplifiers 315. The amplifiers 315 are similar to input buffer 300 and represent circuits which are capable of operating with extremely high input voltages. Each of the amplifiers 315 has an output thereof connected to the K input of the associated flip-flops FF4 through FF7. Flip-flops FF4 through F7 are similar in configuration to flip-flops FF1, FF2 and FF3. The J input of each of the flip-flops FF4 through FF7 is connected to ground. The $P_J$ inputs of flip-flops FF4 through FF7 are connected to the output of driver D2 of logic circuit 1. The toggle inputs C of flip-flops FF4 through FF7 are connected to the output of driver D1 of logic circuit 1. The outputs Q and $\overline{Q}$ of flip-flops FF4 through FF7 are connected to the input of a BCD to decimal translator 316. This translator may be of any typical design known in the art. As will appear hereinafter, the preferred embodiment utilizes a diode matrix.

Translator 316 operates upon the BCD inputs supplied thereto by flip-flops FF4 through FF7 to provide the decimal output represented by the BCD signals. The decimal signals are supplied to an encoder network comprising OR gates 317, 318 and 319. The outputs from each of the OR gates are supplied to further encoding and decoding networks comprising a plurality of NOR gates represented generally at 324. The NOR gates are adapted to receive input signals from the OR gating arrangement fed by translator 316, input signals from function generator 314, and input signals from the timing zone control circuitry. These signals are supplied to the NOR gates in accordance with standard logic concepts. In accordance with these concepts, a proper combination of input signals will produce output signals. The output signals will be indicative of the combination of the input signals. For example, the S signal from function generator 314 is supplied only to one of the sets of NOR gates represented generally at 325. This condition is permissible inasmuch as a spike signal is the only signal which may be produced during the time zone represented by the $\overline{Z}$ signal. The wiggle signals as represented by T and V signals, are supplied to certain gating arrangements (of group 325) comprising only two gates inasmuch as only the $\overline{X}$ and $\overline{Y}$ time zones are permissible.

The NOR gating arrangement which combines the decimal code signals with the function generator and the time zone signals is connected to further gating circuits which comprise OR gates 321, 322 and 323. The OR gates are connected to supply outputs to a galvo-driver 320. Galvo-driver 320 supplies signals to the galvanometer to effect control thereof.

In addition, an output from OR gate 321 is connected to one input of each of the other NOR gates of group 325 relating to the $\overline{X}$ and $\overline{Y}$ zone whereby a wiggle signal is inhibited in the presence of a spike signal. This control is desirable in order to avoid an excessive overdrive at the galvanometer.

The operation for this portion of the circuit is such that the BCD inputs for the particular channel are supplied by BCD input device 3. The signals are supplied via input amplifiers 315 to the K inputs of flip-flops FF4 through FF7. These flip-flops act as a memory wherein the information supplied thereto is stored. In view of the fact that the J input is connected to ground, the signals applied at the K input control the information stored in the memory. The Q and $\overline{Q}$ outputs are coupled to the "BCD to decimal" translator 316 and indicate the condition of the input signal supplied to the associated flip-flop. The $P_J$ signal is supplied by driver D2 but only in conjunction with a Z output from NOR gate 309 which, in effect, signifies the end of a particular character printing operation. The $P_J$ signal resets the memory flip-flops FF4 through FF7 so that the Q output is a logical 1.

The clock (CLK·M2) signal is supplied to the C or toggle input of each of the memory flip-flops. The CLK·M2 signal is supplied only once per print command cycle inasmuch as it is dependent upon the PC·Q signal. The C input signal causes the flip-flops to switch or not in accordance with the K inputs.

The signals from the memory flip-flops are supplied to the BCD-to-decimal translator 316. The translator converts the BCD coded signals into signals representative of decimal outputs. The decimal output signals are supplied to OR gates 317, 318 and 319 for initial operations. The outputs from the aforesaid OR gates 317, 318 and 319 are combined with direct signals from the translator 316 in a bank of NOR gates 324. The outputs of the bank of NOR gates 324 are connected as inputs in another bank of NOR gates 325. The function generator signals and the timing zone control signals are connected to other inputs of the bank of NOR gates 325. The outputs of NOR gates 325 are joined together at the inputs of the respective OR gates 321, 322 or 323. These latter gates determine whether a spike, a left hand wiggle, or a right hand wiggle is to be generated at each time zone. These signals, at the proper time, are supplied to galvodriver 320 whereby the galvometer is controlled.

Figure 4:
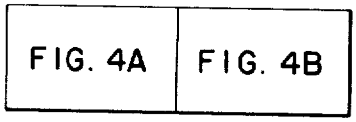
FIGURES 4A and 4B are schematic diagrams of the control circuit portion of the system shown in FIGURE 4.
Figure 4A:
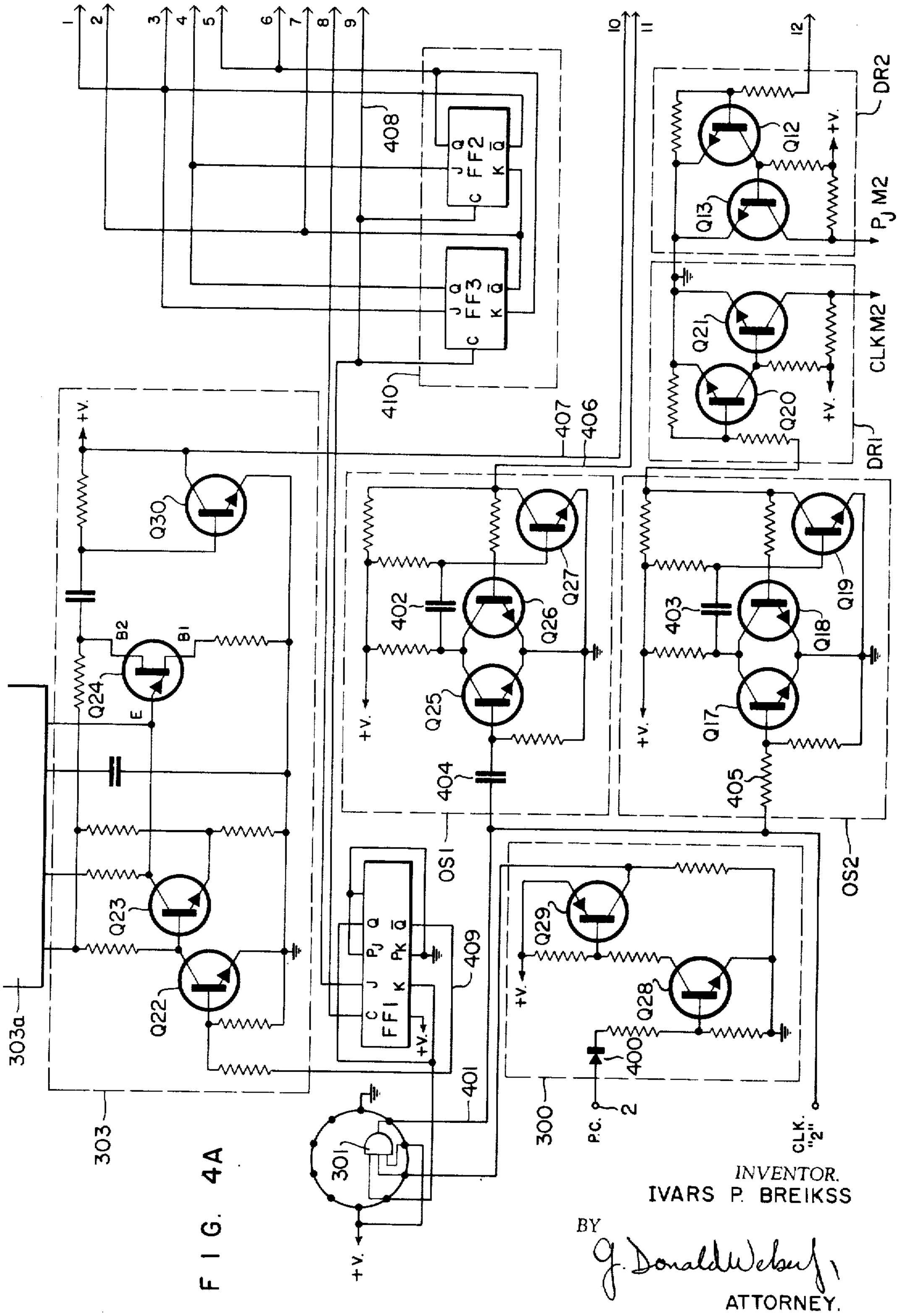
Figure 4B:
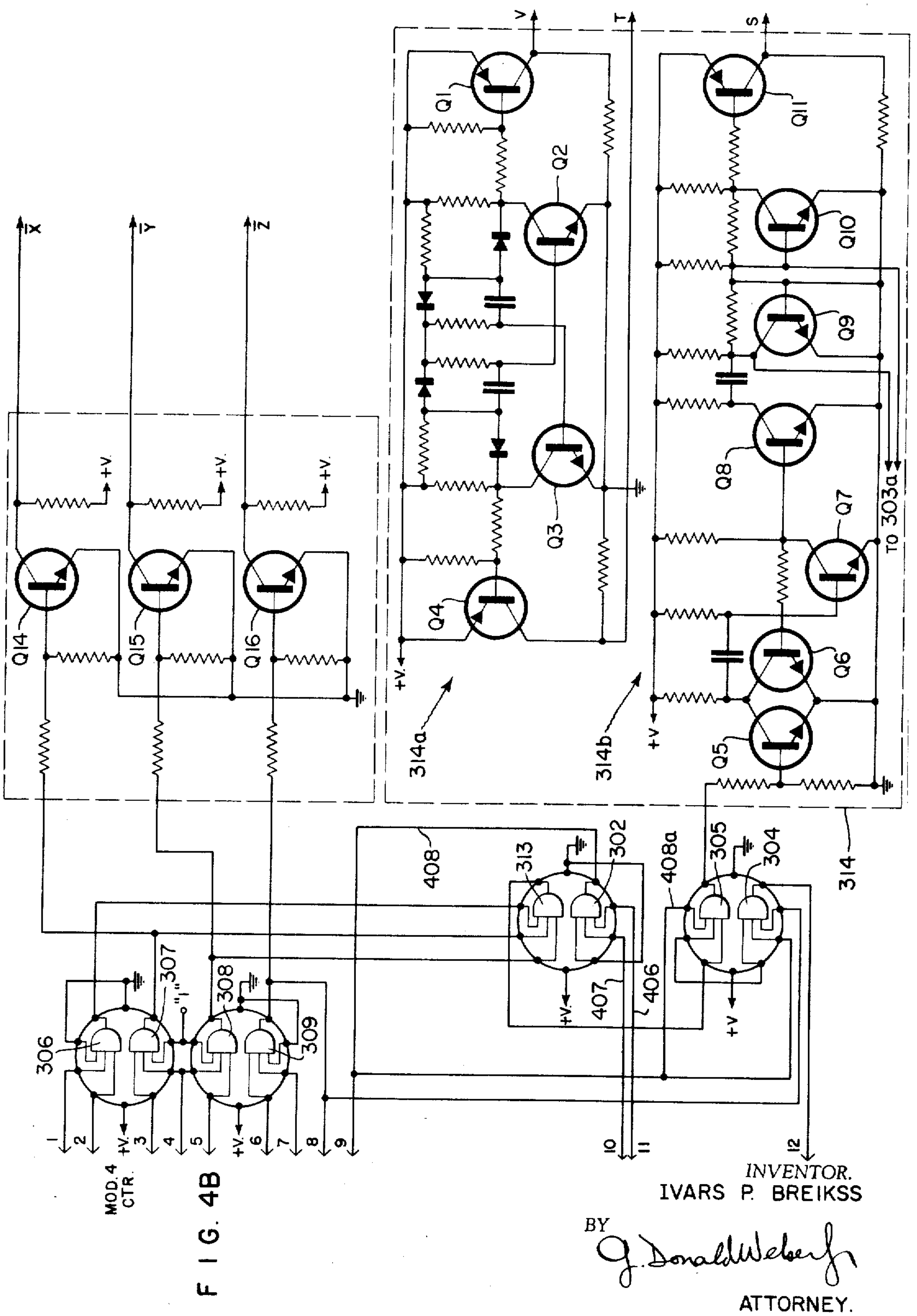

Referring now to FIGURES 4A and 4B, there are shown schematic diagrams of the main frame logic circuit 1 (see FIGURE 1). The circuits of the diagrams of FIGURES 4A and 4B connect as shown in FIGURE 4. The print command signal is supplied at terminal 2 which is connected to diode 400. The diode provides coupling to input buffer 300 which comprises the transistors Q28 and Q29. These transistors are NPN and PNP transistors such as types 2N3904 and 2N3906, respectively. The application of the print command input signal turns on transistor Q28 which causes transistor Q29 to turn on. A signal is supplied from transistor Q29 to an input of AND gate 301 which is included in a micrologic or integrated circuit module. Another input of the three input AND gate 301 is connected to a positive potential source +V. The control input of gate 301 is connected to the Q output of control flip-flop FF1.

The output of gate 301 is connected via line 401 to the inputs of one shot circuits OS1 and OS2. The one shot circuits are substantially similar in configuration. For example, one shot OS1 includes transistors Q25 and Q26 which are NPN transistors, type 2N3904, connected in a differential amplifier configuration. Transistors Q27 is a similar transistor and provides the output signal from the one shot circuit. In one shot circuit OS2, transistors Q17, Q18 and Q19 are similar to the transistors shown in OS1 and perform similar functions. The differences between OS1 and OS2 (in order to obtain different output characteristics) are that capacitors 402 and 403 have values, for example, of 0.0027 microfarad and 0.001 microfarad, respectively. In addition, the input coupling for OS1 is capacitor 404 which can be 0.001 microfarad. In OS2 the input coupling is resistor 405 which may be on the order of 16K ohms. These different values provide different characteristics for the one shot circuits.

The output of one shot circuit OS1 is supplied along line 406 to an input of OR gate 302. Gate 302 is shown as part of an integrated circuit module. Another input of OR gate 302 is connected to ground. Another input of OR gate 302 is connected via line 407 to an output of clock generator 303. The application of either or both of these input signals enables OR gate 302 and an output signal is supplied along line 408 to the C inputs of flip-flops FF1, FF2 and FF3.

The operation of flip-flop FF1, in particular, is described supra. More particularly, the $\overline{Q}$ output of flip-flop FF1 is supplied along line 409 to the base electrode of transistor Q22 which is another NPN type 2N3904 transistor. Transistor Q22 is connected to transistor Q23 and effects the operation thereof. These transistors are connected to unijunction transistor Q24, a type T1S43 transistor. Transistor Q24 operates in a typical manner and triggers upon receipt of an input signal of a predetermined level at the emitter electrode thereof whereby transistor Q30 is selectively operated. It is noted that a control device **303*a* is utilized to control the rate at which the clock generator 303 produces output signals. Control element 303*a*** is also associated with the control mechanism which regulates the speed at which the recording medium is driven. Thus, the medium speed and the circuit operation are correlated.

As noted supra, clock generator 303 selectively supplies signals via line 407 to OR gate 302. That is, with the application of a signal along line 408 to control flip-flop FF1, the $\overline{Q}$ output is switched high thereby turning on transistor Q22 and rendering clock generator 303 operative. In the case where output $\overline{Q}$ is a low level signal, clock generator 303 is effectively clamped and inhibited.

The clock pulses which are supplied along line 407 to OR gate 302, are also applied via line 408 to the C or toggle inputs of flip-flops FF2 and FF3 which function as a counter 410. The inputs and outputs of flip-flops FF2 and FF3 are interconnected as described in FIGURE 3. Moreover, the outputs from counter 410 are connected to gates 306, 307, 308 and 309. These latter NOR gates produce output signals in response to the proper input conditions.

The outputs from gates 307, 308 and 309 are supplied to inverters which comprise transistors Q14, Q15 and Q16. The collector electrodes of the inverter transistors are connected to output terminals wherein the $\overline{X}$, $\overline{Y}$ and $\overline{Z}$ timing control signals are supplied. Thus, as suggested supra, clock generator 303 provides regularly recurring signals which cause time controlled switching of counter 410. Signals supplied by counter 410 are applied to the Mod 4 counter whereby output signals are supplied by the counter in a timed relationship. The signals are supplied to the inverters which are necessary only to provide proper polarity for suitable output signals.

The output signals from the Mod 4 counter NOR gates are supplied to OR gate 313 which is again part of a micrologic module. The output from OR gate 313 is supplied to one input of AND gate 305 which is a portion of another micrologic module. The output of gate 305 is supplied to function generator 314.

Function generator 314 comprises two circuit networks, namely a circuit for providing alternating (or wiggle) outputs and a circuit for providing a spike output. Spike generating network **314*b* is connected to the output of AND gate 305. In this manner, the spike output signal S is synchronized with the initiation of any of the timing zones as controlled by the timing zone signals. It should be noted that spike generator 314*b* has connections between transistors Q9 and Q10 respectively and the clock generating control element 303*a***. This interconnection is utilized to control the spike signal in terms of length of duration such that for high speed record medium movement, a relatively slow spike pulse is not supplied whereby erroneous information would be recorded.

The alternating signal network **314*a*** is, in essence, a multivibrator which provides two output signals V and T which are 180° out of phase. Output signals V and T may be sinusoidal waves, square waves or the like. These signals are the so called "wiggle" signals.

Figure 5:
FIGURES 5A and 5B are schematic diagrams of the character generating circuit portion of the system shown in FIGURE 5.
Figure 5A:
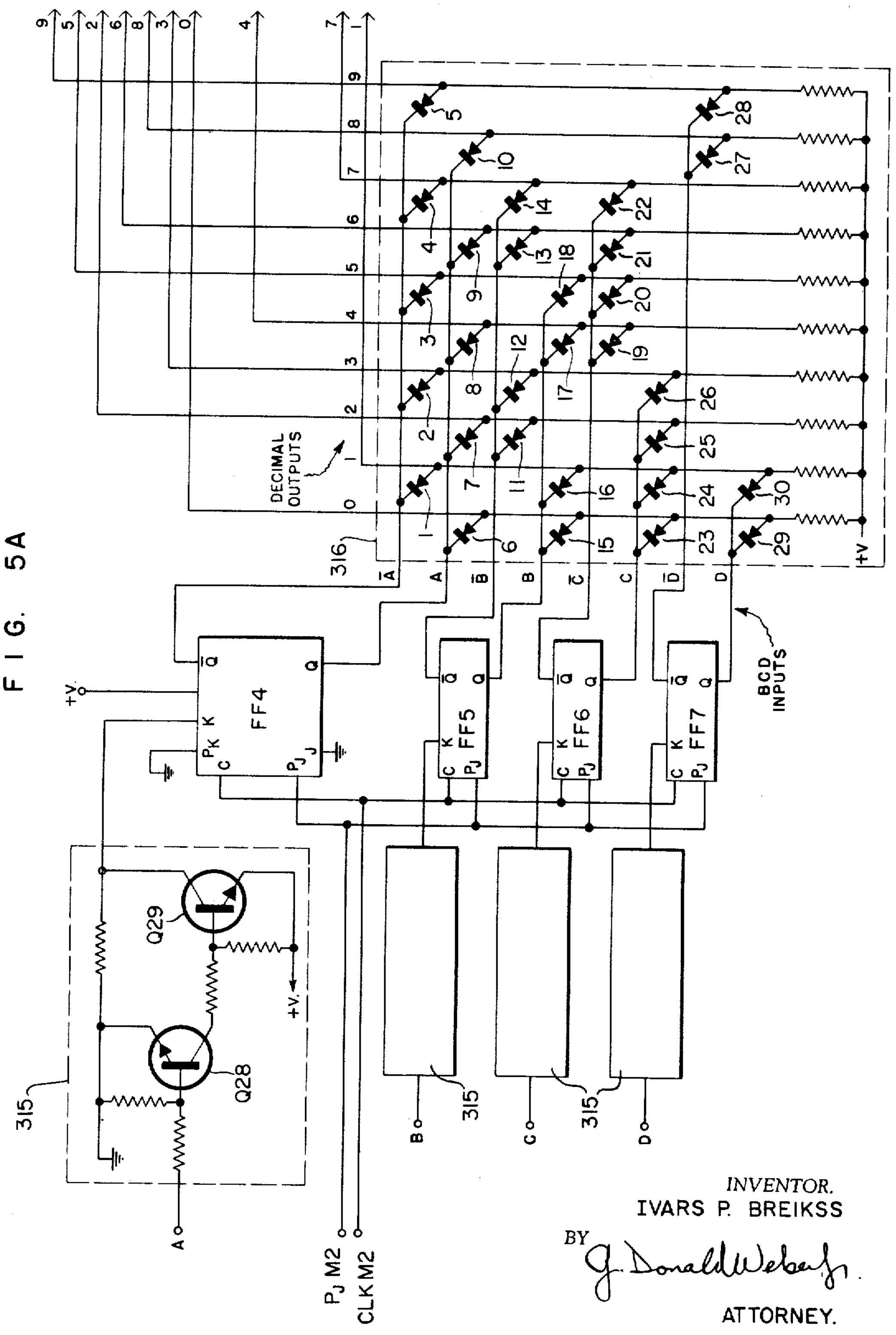
Figure 5B:
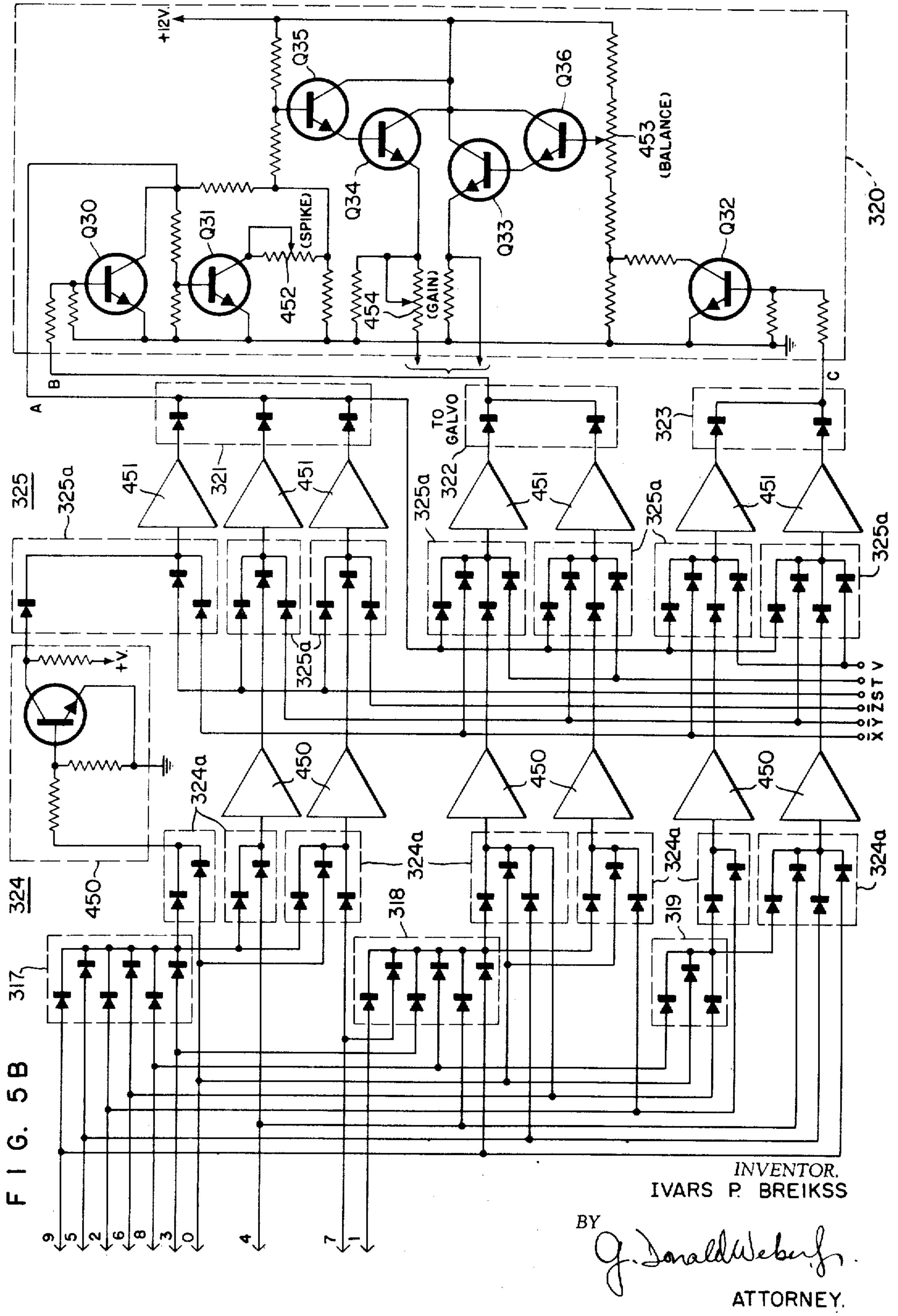

Referring now to FIGURES 5A and 5B, there are shown schematic diagrams of the character generating circuits. The circuits of the diagrams of FIGURES 5A and 5B are connected as shown in FIGURE 5. It is understood that FIGURES 5, 5A and 5B represent only a single channel whereby a single character is generated. The number of channels utilized is the same as the number of characters to be generated; each of the channels is substantially identical in configuration.

The binary coded decimal (BCD) signals A, B, C and D are applied to input terminals associated with input amplifiers 315. These input amplifiers are substantially identical to the input buffer 300 discussed supra. The output signals from amplifiers 300 are applied to the K inputs of the flip-flops FF4 through FF7, respectively. Outputs are taken from the Q and $\overline{Q}$ terminals of the aforesaid flip-flops. These signals produced at the Q and $\overline{Q}$ terminals are the real and the complement of the input signals. Thus, flip-flop FF4 produces output signals A and $\overline{A}$; flip-flop FF5 produces signals B and $\overline{B}$; flip-flop FF6 produces output signals C and $\overline{C}$; and flip-flop FF7 produces output signals D and $\overline{D}$. These signals are supplied to input lines on the BCD to decimal translator 316.

Translator 316 comprises a diode matrix. A plurality of input lines (for example 8 lines) and a plurality of output lines (for example 10 lines) form the coordinates for the matrix. One end of each of the output lines is connected, via a separate current limiting resistor, to a potential source. The other end of each decimal output line is connected to an input of the encoding logic circuitry.

At selected intersections between the BCD input and decimal output lines there is an interconnecting diode with the anode connected to the decimal line and the cathode connected to the BCD line. Thus, in this configuration assuming, all BCD signals to be low, current flow exists in the path from the potential source, through the current limiting resistor, through the appropriate intersection diode to the associated flip-flop. Consequently, when the proper flip-flop signals are provided, certain of the coupling diodes are reverse biased. Consequently, a signal supplied by the potential source passes through the current limiting resistor to the decimal output line which is connected to a particular logic gate in the encoding network. For example, if a decimal 3 is to be generated, the BCD inputs which are required are positive or high level signals at the $\overline{A}$, $\overline{B}$ and C inputs. The signals produced by flip-flop FF7 are immaterial inasmuch as there is no interconnection between the D, $\overline{D}$ input lines and the affected decimal output lines.

In the signal condition described, the potential source applies the signal through the associated current limiting resistor to the decimal 3 output line. A signal in the decimal output line is not diverted inasmuch as diodes CR2, CR12 and CR26 are reverse biased by the aforesaid BCD input signals. Conversely, no other decimal output line receives a signal inasmuch as at least one other coupling diode diverts the potential supplied to each line into an associated flip-flop.

The decimal output lines are connected to the encoding network. The encoding network includes OR gates 317, 318 and 319. Each of these gates comprises a plurality of diodes connected to pass the signal supplied by a decimal output line. In addition, NOR logic banks 324 and 325 receive decimal output signals directly as well as signals from the aforesaid OR gates. In particular, the NOR logic is produced by combining an OR gate with an inverter network. Thus, a plurality of OR gates and the arrangement designated 324*a* comprise a plurality of diodes which are connected to form a plurality of OR gates. Each of the OR gates produces an output which is supplied to an input of inverter 450. In the preferred embodiment, inverter 450 comprises an NPN transistor connected in common emitter arrangement. The outputs of inverters 450 (all of which inverters are substantially identical) are connected to NOR logic bank 325. NOR logic bank 325 comprises a plurality of OR gates 325*a* with the outputs thereof connected at the inputs of inverters 451 (which inverters are identical to inverters 450).

Also supplying signals to the OR gates 325*a* are the $\overline{X}$, $\overline{Y}$, $\overline{Z}$ signals supplied by the timing control network. The function generator network supplies the S, T and V signals to gates 325*a*.

After operation by NOR logic bank 325, output signals are supplied to OR gates 321, 322 and 323. These gates supply input signals to galvo-driver 320. In particular, the signals labelled A, B and C are supplied by gates 321, 322 and 323, respectively. The A signal is, by defiinition, larger in amplitude than either the B or C signals. Specifically, the A signal is supplied to transistor Q31 while the B and C signals are applied to transistors Q30 and Q32, respectively.

The application of signal A to transistor Q31 causes conduction thereby. Conduction by transistor Q31 varies the potential drops in the resistance network connected between the +12 volt source and ground. This potential variation produces changes in the signal at the base of transistor Q35. The variation in the potential at the base of transistor Q35 produces a commensurate variation in the conduction of transistor Q34. Since transistors Q33 and Q34 are connected in differential amplifier fashion, the alteration in conduction in transistor Q34 creates an imbalance in the differential amplifier circuit. Thus, a current flow exists at the output of the differential amplifiers and is supplied to the galvanometer. It is readily seen that the application of the B or C signals to the transistors Q30 or Q32, respectively, will cause a similar type of imbalance. This imbalance will cause a signal to be applied to the galvanometer.

It should be noted, that signal A has been defined as being larger than signal B or C. Thus, signal A will cause a greater imbalance in the system whereby a larger signal will be supplied to the galvanometer. As suggested in the aforesaid copending application of Norman L. Stauffer, the larger signal will cause a large movement of the galvanometer and thus a traverse of a mask by a reflected light beam. The spike signal consequently causes a specific type of recording on a recording medium.

The B and C signals are designated as the so-called "wiggle" signals. These signals are not so large as the A signal whereby the light beam does not traverse the entire mask opening and only a smaller area of the recording medium is recorded upon.

In the galvo-driver circuit, a variable resistor 452 connected to transistor Q31 provides a control over the amount of imbalance which may be produced by the application of signal A to transistor Q31. Thus, resistor 452 controls the amplitude of the spike signal which is supplied to the galvanometer. Potentiometer 453 is connected to the base of transistor Q36 of the differential amplifier network and is used to balance the system in the steady state. Resistor 454 is connected in series with the differential amplifier and provides a variable attenuation function. Therefore, variation of resistor 454 will control the gain of the galvo-driver 320.

Figure 6:
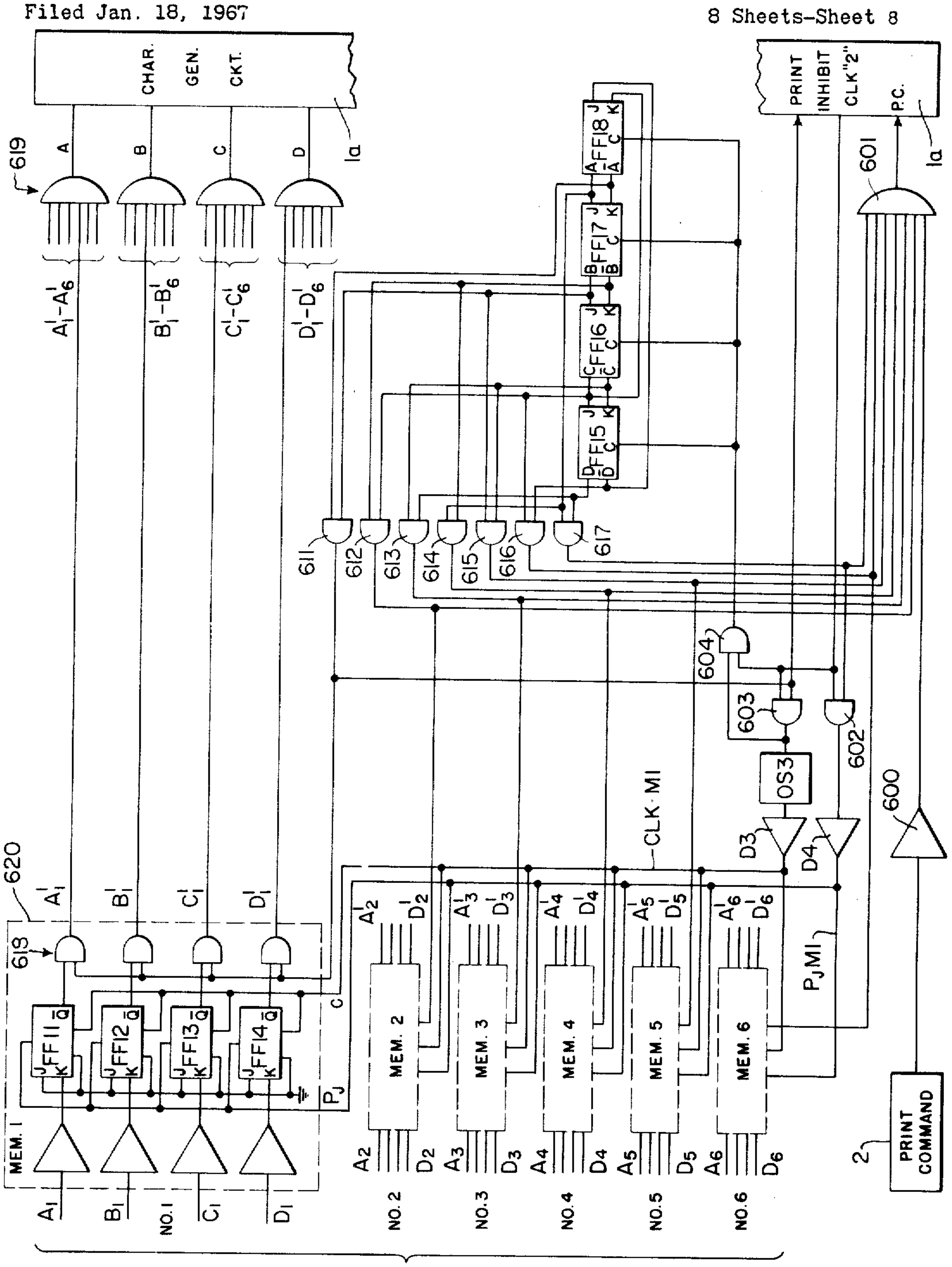
FIGURE 6 is a logical flow diagram of the embodiment shown in FIGURE 2 and utilized to provide the second method of printing.

Referring now to FIGURE 6, there is shown a logical flow diagram of a second embodiment of the invention. More particularly, this embodiment relates to the system shown in FIGURE 2, wherein the vertical or sequential type of printing is provided. In this embodiment, similar reference numerals refer to components previously described. Control means 2 which supplies the print command signal is connected to an input buffer or amplifier 600 similar to amplifier 300 previously described. The output of amplifier 600 is connected to one input of OR gate 601. The output of OR gate 601 is connected to the main frame logic 1*a*. In particular, the output of OR gate 601 is connected to input buffer 300 as shown in FIGURE 3. Also connected to inputs of OR gate 601 are outputs of NOR gates 611 through 617.

The Clock 2 input from main frame logic 1*a* is, in fact, an output from ATD gate 301, shown in FIGURE 3. The Clock 2 signal is supplied to one input of AND gate 602. Another input to gate 602 is supplied by NOR gate 617. The output of AND gate 602 is connected to driver D4 which supplies the signal $P_J$ M1 which is connected to the $P_J$ or preset inputs of memories 1–6. This signal is utilized to preset the memory to an operative condition wherein signals may be supplied thereto for subsequent operation.

The Clock 2 input from main frame logic 1*a* is also supplied to one input of AND gate 603. Another input of AND gate 603 is supplied by NOR gate 611. The output of AND gate 603 is connected to a one shot circuit OS3. The output of the one shot circuit is connected to driver D3 whereby the signal CLK.M1 is provided. This signal is supplied to the C or toggle input of memories 1–6. This signal causes the operation of the memories at the selected time.

The OR gate 604 has the inputs thereof connected to the output of AND gate 603 and to the Clock 2 signal input, respectively. The output of gate 604 is connected to the C or toggle inputs of flip-flops FF15, FF16, FF17 and FF18, respectively, which flip-flops provide a Mod 7 counter. The direct and complementary outputs of gates FF15 through FF18 are connected to inputs of NOR gates 611 through 617 such that these gates are selectively enabled in a sequential fashion as controlled by the Mod 7 counter. The signals from the respective NOR gates 611 through 617 are connected to the output AND gates 618 in the respective memories 1 through 6. The outputs of the AND gates 618 are connected to inputs of OR gates 619.

Thus, four OR gates 619 are shown. Each of these OR gates receives one of the four outputs from each of the six memories. Thus, since there are six memories each of the OR gates has six inputs. Since there are four outputs per memory, four OR gates are required. Each of these outputs supplies an output signal to the character generating circuit 1*a* of FIGURE 2.

In operation, a print command signal is supplied from source 2 via buffer 600 and gate 601 to the circuit shown in FIGURE 3. The Clock 2 signal is provided by the output of gate 301 and supplied to an input of gate 602. Since the flip-flops of Mod 7 counter have been properly preset, the signals produced by the flip-flops FF15 through FF18 are such that the A, B, C and D outputs are initially low while the complement signals are high level. Therefore, NOR gate 617 provides a high level output signal. The AND gate 602 is enabled whereby the $P_JM1$ signal is supplied to memories 1 through 6.

The Clock 2 signal is simultaneously supplied via OR gate 604 to the C or toggle inputs of flip-flops FF15 through FF18. Due to the interconnections thereof, only flip-flop FF18 is conditioned to be switched by the application of a clock or toggle signal. That is, the J input of flip-flop FF18 is connected to the $\overline{D}$ output of flip-flop FF15 whereby a high level input is supplied thereto. The application of the toggle signal causes A and $\overline{A}$ output signals from flip-flop FF18 to reverse polarity. Thus, with the application of the first clock signal, the A signal becomes a high level signal and the $\overline{A}$ signal becomes a low level signal. Since the B signal is already a low level signal, NOR gate 611 is enabled and produces a high level output signal. This signal is supplied to one input of AND gate 603 along with the Clock 2 signal whereby an enabling signal is supplied to one shot OS3.

As noted supra, one shot circuit OS3 enables driver D3 whereby the CLKM1 signal is supplied to the clock or toggle input of each of the flip-flops of memories 1–6. This signal permises the respective flip-flops such that the conditions thereof may be detected at AND gates 618.

Referring to memory 1, shown within dotted line 620, four inputs A1, B1, C1 and D1 are supplied to input amplifiers. The input amplifiers are connected to the K inputs of flip-flops FF11 through FF14. The J inputs of these inputs are connected to ground. Consequently, the flip-flops FF11 through FF14 operate as toggle flip-flops. The conditions of outputs Q and $\overline{Q}$ are determined in accordance with the signal conditions supplied by the input signals. For example, if input signal A1 is a high level signal, the K input of flip-flop FF11 receives a high level input signal. Upon application of a clock signal, flip-flop FF11 produces a high level $\overline{Q}$ output signal. The converse operations obtains if input signal A1 is a low level signal.

If the $\overline{Q}$ output of any of the flip-flops is a low level signal, the associated AND gate 618 clearly is not enabled and the output produced thereby will be a low level signal. On the contrary, if the Q output of the flip-flop is a high level signal, the associated AND gate 618 will be enabled upon the application of a high level output signal from the associated NOR gate 611 through 616. Each of these NOR gates supplies a signal to a different memory whereby the memories are enabled in sequence in accordance with the enabling of the NOR gates by means of Mod 7 counter. The output signals $A1^1$, $B1^1$, $C1^1$ and $D1^1$ from memory 1 are supplied as input signals to OR gates 619. The comparable signals from memories 2 through 6 are also supplied through OR gates 619. The OR gates 619 operate upon the input signals in order to provide the output signals A, B, C and D which, as noted supra, are connected to a character generating circuit as described supra.

The output signal from OR gate 611 in addition to connection to the input of memory 1 and AND gate 603 is connected to the print inihibit circuit of main frame logic 1*a*. In particular, this signal is supplied to inputs of gates 307 and 308 included in the Mod 4 counter shown in FIGURE 3. This signal, a high level signal, inhibits operation of the aforesaid NOR gates such that printing cannot be undertaken by the parallel or horizontal printing circuitry when the serial or vertical printing circuitry is in control. It may be seen that the two circuit embodiments can be used separately or together. More particularly, the embodiment shown in FIGURE 6 modifies the operation of the device shown in FIGURE 3 and provides a selective operation within a single machine. A detailed schematic diagram is not believed to be essential since the components shown in FIGURE 6 are similar to those shown in other figures.

Figure 7:
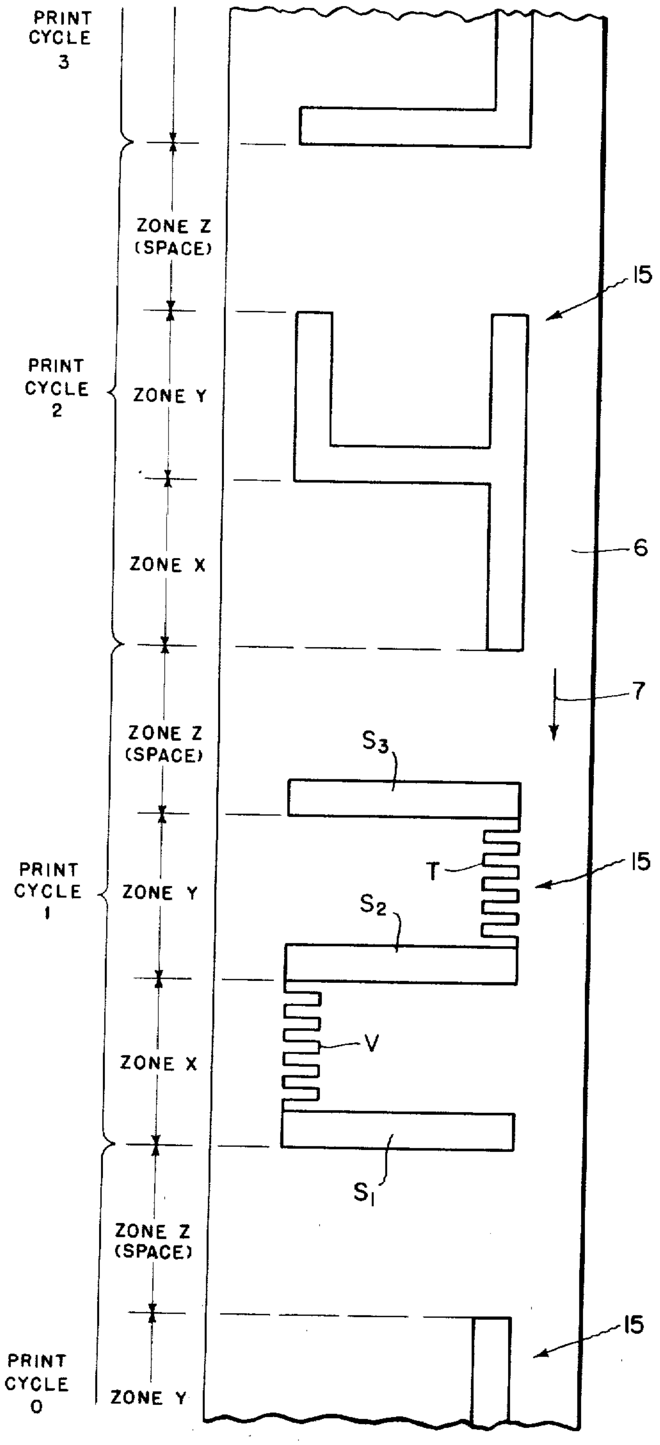
FIGURE 7 is a diagrammatic showing of characters printed in accordance with control circuitry shown in the foregoing circuit diagrams.

Referring now to FIGURE 7, there is shown, schematically, a diagram which is indicative of the operation which is controlled by the subject circuits. Elements which are similar to those discussed supra bear similar reference numerals. Thus, a recording medium 6 is moved in the direction of arrow 7. A plurality of print cycles, namely print cycles 0, 1, 2 and 3 are shown. Each of the complete print cycles comprises three zones namely zone X, Y and zone Z. Zone Z may be somewhat smaller than zones X or Y. However, zone Z includes the space between adjacent characters 8. Print cycles 0 and 3 are not described in detail since they are not fully shown.

In print cycle 1, a printed character 8 (more specifically the numeral 2), is shown as having been printed. Since the beam reflected from the galvanometer traverses the recording medium in a direction transverse to the movement thereof, the spike signal S passes rapidly across the entire width of the printable area. In the numeral 2, there are three horizontal "bars" recorded. The first bar is recoded during the zone X operation. In order to achieve this operation, it is necessary to have received the S (spike) signal as well as the $\overline{X}$ signal from the function generator and timing control system noted supra. These control functions are combined with the decimal output signal from translator 316 and have produced a signal A which produces the horizontal indication S1.

Spike signal S1 is a signal having relatively short duration. Consequently, the zone X time period signal is still supplied to the encoding circuitry when a wiggle signal, or signal V is presented. Again, a proper combination of $\overline{X}$, V and decimal ouput signals are required. This signal would be equivalent to, for example, a B signal supplied to the galvanometer driver 320. In this case, whereas the large spike signal A drove the galvancmeter such that the reflected light beam moved entirely across the printing area, the smaller B signal produces a high frequency pulsating signal which traverses and prints at only a small portion of the recording area. At the termination of zone X, the zone Y signal is produced by the Mod 4 counter.

The zone Y signal is again produced in conjunction with an S signal to produce the full trace S2. However, during the zone Y time period, the encoding network has combined a $\overline{Y}$, T and decimal output to produce the signal C which is applied to the galvo-driver 320. This combination of signals produces the wiggle signal T which causes the galvonometer reflected light beam to impinge upon and print on the other side of the printing area. It is noted that the T and V signals, due to being 180° out of phase produce similar results on the recording medium but on opposite sides of a mask covering said medium. At the end of the zone Y time period, the zone Z signal is produced.

It may be seen from FIGURE 3, for example, that the zone Z signal is combined only with the spiked signal. Consequently, only a recording such as S3 may take place during zone Z. A T or V signal cannot occur during zone Z. Thereby, a space between characters is provided.

Similar operation occurs during print cycle number 2 wherein the numeral 4 is the character which is printed. Since the wiggle signal T or V is of relatively high frequency, the vertical line portion or segments are shown solid rather than sinuously. The sinuous line portions shown in print cycle 1 are for explantory purposes only. By operating upon the frequency of the T and V signals, the apparent solidity of continuity of the vertical line may be altered.

Thus, there has been described a printing apparatus which provides at least two distinct methods of printing. Separate control logic circuitry is utilized to select the method of printing to be utilized. Similar circuitry may be controlled by the logic circuitry to perform similar functions. The circuits are described in terms of preferred embodiments. It is understood that modifications can be made to portions of the circuits. So long as any modifications fall within the scope of the appended claims, these modifications are meant to be included within the area of protection defined herein.

The embodiments of the invention in which an exclusive property or privilege is claimed are defined as follows:

1. A control apparatus for galvanometer recording comprising: logic circuit means for generating a plurality of control signals; signal supplying means for supplying command signals to said logic circuit means; input means for supplying coded input signals; waveform generating circuit means for generating specialized waveforms in response to combinations of said coded input signals and said control signals from said logic circuit means; a recording medium; galvanometer means for recording on said recording medium; said galvanometer means for recording being controlled by said specialized waveforms generated by said waveform generating circuit means; said logic circuit means including clock signal generating means, flip-flop means for selectively enabling said clock signal generating means, circuit means connected to said flip-flop means to selectively switch the state of said flip-flop means in response to said command signals from said signal supplying means, counter means connected to said circuit means and to said clock signal generating means to count signals produced by said clock signal generating means subsequent to said command signals, gating means connected to said counter means for supplying a signal to said flip-flop means to switch the aforesaid state thereof when a predetermined count is achieved at said counter means, means for supplying timing pulses indicative of different counts in said counter means, and means connecting said different counts of said counter means to said waveform generating circuit means to produce said specialized waveforms for application to said galvanometer means for recording on said recording medium.

2. The apparatus recited in claim 1 including conversion circuit means for converting simultaneously supplied coded input signals into sequentially supplied output signals, said conversion circuitry having means for transferring said command signals from said signal supplying means to said logic circuit means.

3. The apparatus recited in claim 2 wherein said conversion circuit means includes memory means for storing information supplied thereto, further counter means for selectively addressing said memory means to cause the output of information from said memory means, and means supplying control signals to said memory means and to said further counter means for controlling the operation thereof.

4. The apparatus recited in claim 1 wherein said waveform generating circuit means comprises; means for receiving said coded input signals arranged in one code, at least one further flip-flop means connected to receive said coded input signals for producing direct and complement signals relative to said coded input signals, translating means connected to receive said direct and complement signals for translating said signals to a second set of coded input signals having a different coded arrangement, decoding means connected to receive said signals from said translating means for producing signals indicative of information to be recorded by said apparatus, and further gating means for combining said information indicative signals and said control signals from said logic circuit means to produce said specialized waveforms for application to said galvanometer means for recording on said recording medium.

5. The apparatus recited in claim 5 wherein said translating means comprises a diode matrix, said diode matrix including a plurality of diodes having similar electrodes connected to a common source, each of said diodes having another electrode connected to the direct or complement output of said further flip-flop means in a coded arrangement, said direct and complement signals selectively disabling certain ones of said diodes, whereby said common source is disconnected from said further flip-flop means and connected to said decoding means.

References Cited

UNITED STATES PATENTS

| | | | |
|---|---|---|---|
| 3,159,818 | 12/1964 | Scantlin | 340—172.5 |
| 3,017,625 | 1/1962 | Evans et al. | 340—324.1 |
| 3,020,530 | 2/1962 | Volberg | 340—324.1 |
| 3,241,120 | 3/1966 | Amdahl | 340—172.5 |
| 3,249,923 | 5/1966 | Simshauser | 340—324.1 |
| 3,329,937 | 7/1967 | Lewin | 340—172.5 |
| 3,345,458 | 10/1967 | Cole et al. | 340—324.1 |
| 3,345,608 | 10/1967 | Brown et al. | 340—172.5 |
| 3,380,068 | 4/1968 | Davis | 346—109 XR |
| 3,381,277 | 4/1968 | Stansby | 340—172.5 |

PAUL J. HENON, Primary Examiner

HARVEY S. SPRINGBORN, Assistant Examiner

U.S. Cl. X.R.

340—324